United States Patent
Liu (10) Patent No.: US 8,382,292 B2
(45) Date of Patent: Feb. 26, 2013

(54) LIGHT SOURCE MODULE INCLUDING A LIGHT SWITCHING ELEMENT AND CONTROL OF COLOR SEQUENCES

(75) Inventor: Chin-Ku Liu, Hsin-Chu (TW)

(73) Assignee: Coretronic Corporation, Hsinchu (TW)

( * ) Notice: Subject to any disclaimer, the term of this patent is extended or adjusted under 35 U.S.C. 154(b) by 626 days.

(21) Appl. No.: 12/569,597

(22) Filed: Sep. 29, 2009

(65) Prior Publication Data
US 2010/0123879 A1 May 20, 2010

(30) Foreign Application Priority Data
Nov. 17, 2008 (TW) ................. 97144403 A (51) Int. Cl.
*G03B 21/20* (2006.01)
*F21V 9/00* (2006.01)
(52) U.S. Cl. ......................... 353/85; 362/231
(58) Field of Classification Search .............. 353/31, 353/85, 84, 98, 121, 32; 250/205, 208.1, 250/216, 226; 348/473, 742–748, 813; 362/16, 362/17, 18, 227, 231, 236, 247, 249.05, 249.02, 362/346, 339, 321; 359/226.2, 234, 235, 359/236
See application file for complete search history.

(56) References Cited

U.S. PATENT DOCUMENTS

| | | | | |
|---|---|---|---|---|
| 5,398,082 A | * | 3/1995 | Henderson et al. | 348/781 |
| 6,935,749 B2 | * | 8/2005 | Kato | 353/38 |
| 7,322,703 B2 | | 1/2008 | Matsui | |
| 7,628,495 B2 | * | 12/2009 | Tangen | 353/94 |
| 7,646,368 B2 | * | 1/2010 | Roth et al. | 345/84 |
| 2004/0070736 A1 | | 4/2004 | Roddy et al. | |
| 2005/0213051 A1 | * | 9/2005 | Smet | 353/85 |
| 2006/0023172 A1 | * | 2/2006 | Ikeda et al. | 353/94 |
| 2008/0310168 A1 | * | 12/2008 | Huang | 362/297 |

FOREIGN PATENT DOCUMENTS
TW I284775 8/1994

* cited by examiner

*Primary Examiner* — Que T Le
*Assistant Examiner* — Jennifer Bennett
(74) *Attorney, Agent, or Firm* — Kirton McConkie; Evan R. Witt (57) ABSTRACT

A light source module adapted to be used in a projection apparatus includes a first LED device, a second LED device, and a light switching element. The first LED device emits a first light beam along a first light path during a first time period. The second LED device emits a second light beam along a second light path during a second time period. The light switching element is disposed at an intersection of the first light path and the second light path for permitting one of the first light beam along the first light path and the second light beam along the second light path to be transmitted along a third light path.

5 Claims, 7 Drawing Sheets

LIGHT SOURCE MODULE INCLUDING A LIGHT SWITCHING ELEMENT AND CONTROL OF COLOR SEQUENCES

FIELD OF THE INVENTION

The invention relates to a light source module, and more particularly to the light source module adapted to be used in a projection apparatus.

BACKGROUND OF THE INVENTION

Recently, a digital projection and display system is commercially available from Texas Instruments Incorporated (TI) under the trademark Digital Light Processing® (also referred as DLP). The DLP digital projection and display system utilizes a digital micromirror device (DMD) in the light path. The digital micromirror device (DMD) is fabricated according to a MEMS (Micro-Electro-Mechanical System) technology. Typically, the DMD includes a great amount of tiny digital light switches. The digital light switches are very small-sized micromirrors allowing for fast and precise rotation in receipt of electronic control signals. Each of the micromirrors is a light switch that is capable of reflecting light in one of two directions. When the micromirror is in an "on" state, the incident light is reflected into the pupil of the projection lens and thus the micromirror appears bright in this "on" state. Whereas, when the micromirror is in an "off" state, the incident light is reflected out of the pupil of the projection lens and thus the micromirror appears dark in this "off" state.

Desired gray scales are achieved by using binary pulse width modulation to control the micromirrors. For example, a digital data of an 8-bit binary code may be converted into a pulse width of 256 discrete levels such that there are 256 bright-to-dark duration ratios for the micromirror. That is, this gray scale sets an image resolution of 256.

Figure 1:
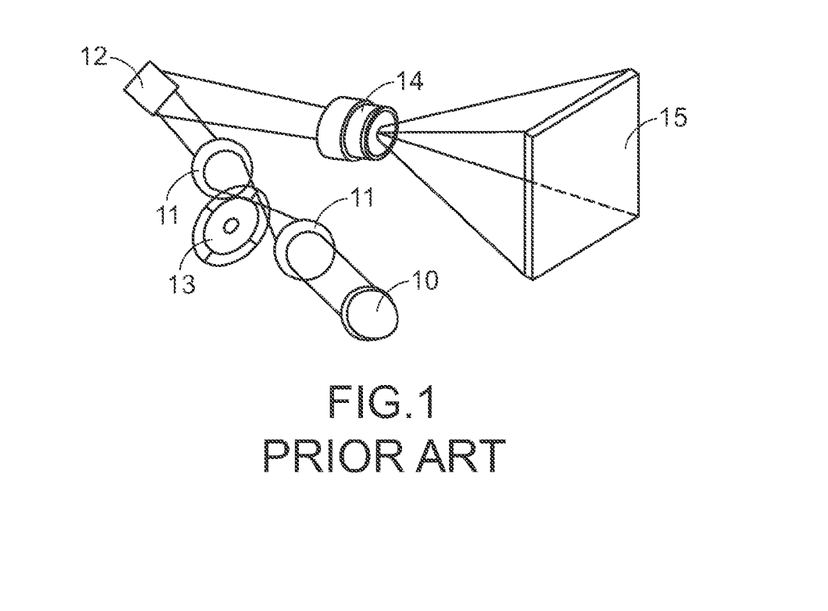
FIG. 1 is a simplified diagram illustrating a conventional DMD-type digital projection and display system.

FIG. 1 is a simplified diagram illustrating a conventional DMD-type digital projection and display system. In the digital projection and display system of FIG. 1, a light beam emitted by a light source 10 is focused and shaped by a lens assembly 11 and then transmitted to a digital micromirror device (DMD) 12. The light beam is then selectively reflected by the digital micromirror device 12 to create a visual image on a screen 15 through a projection lens set 14. In addition, a color wheel 13 disposed between the light source 10 and the digital micromirror device 12 is a component for displaying colorful images through the digital micromirror device 12. As the color wheel 13 rotates for a revolution in a unit time period, the light beam emitted by a light source 10 successively passes through different sections of the color wheel 13 such that different colors of light are projected onto the digital micromirror device 12 in different time segments. For example, if the color wheel 13 has four light-transmissive sections with different colors (e.g. white, red, green, and blue sections), white, red, green, and blue light beams are successively filtered by the color wheel 13 in different time segments of the unit time period and projected onto the digital micromirror device 12. By using the above stated binary pulse width modulation, different colors with different intensities may be adjusted in each time segment so as to mix a desired color.

Nowadays, with the maturity of the light emitting diode (LED) technology, the conventional white light source is gradually replaced by the LED. That is, the LED may be used as the light source of a projection apparatus.

Figure 2:
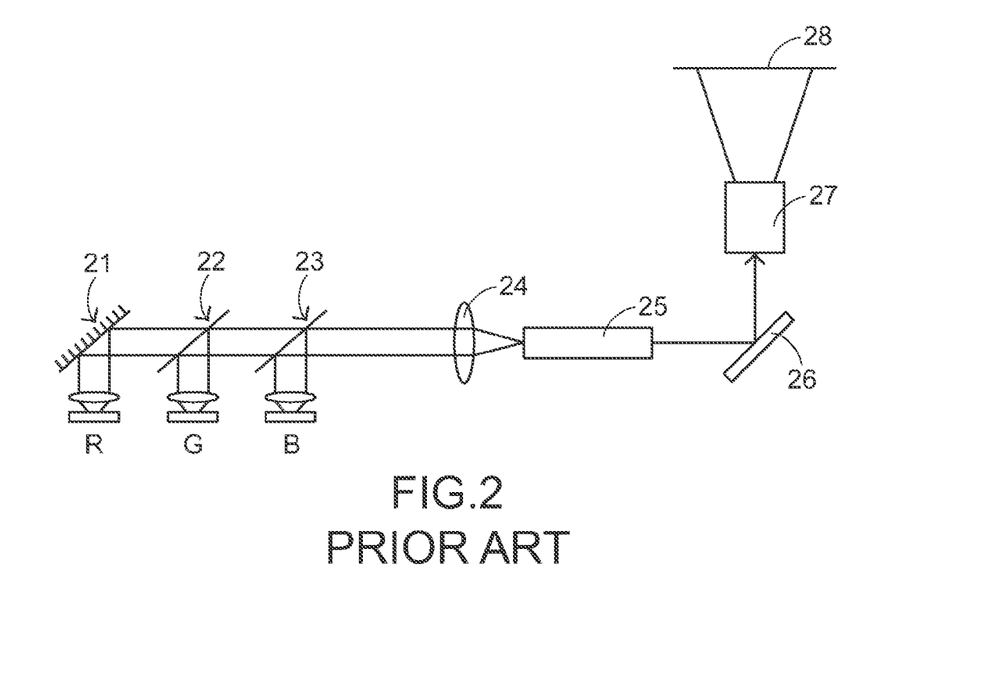
FIG. 2 is a schematic view illustrating a projection apparatus using light emitting diodes as light sources according to prior art.

FIG. 2 is a schematic view illustrating a projection apparatus using light emitting diodes as light sources according to prior art. As shown in FIG. 2, the light source 10 includes a red color light source R, a green light source G, and a blue light source B for emitting a red light beam, a green light beam, and a blue light beam respectively. By means of a reflective mirror 21 and dichroic mirrors 22 and 23, the red light beam is reflected by the reflective mirror 21. The dichroic mirrors 22 permits the red light beam to pass through the dichroic mirror 22 and reflects the green light beam. The dichroic mirror 23 permits the red light beam and the green light beam to pass through the dichroic mirror 23 and reflects the blue light beam. After processed by the reflective mirror 21 and the dichroic mirrors 22 and 23, the red, green, and blue light beams are mixed and then focused by a condenser lens 24. The focused red, green, and blue light beams are then subject to homogenization by an integrator rod 25. The red, green, and blue light beams are then processed by the digital micromirror device 26 to create a visual image on a screen 28 through a projection lens set 27. Since the LED has a quick response speed, the on/off states of the LED may be controlled by a switching circuit. In other words, the use of the switching circuit may replace the color wheel 13 as shown in FIG. 1. Due to the arrangement restriction of the dichroic mirrors 22 and 23, the LEDs of the conventional projection apparatus may emit color beams of respective wavelengths. Under this circumstance, the thermal load of each LED is very heavy. Generally, as the temperature of the LED is increased, the illuminating efficiency of the LED is reduced and thus the overall brightness value of the projection apparatus fails to be effectively enhanced.

Therefore, there is a need of providing a light source module to obviate the drawbacks encountered from the prior art.

SUMMARY OF THE INVENTION

The invention provides a light source module having a low operating temperature and a high brightness value. The light source module is adapted to be used in a projection apparatus.

Other objectives and advantages of the invention will be further understood from the further technological features disclosed by the embodiments of the invention.

For achieving one, or some or all of the above-mentioned objectives or other objectives, there invention provides a light source module.

In accordance with an aspect of the embodiment of the invention, a light source module adapted to a projection apparatus is provided. The light source module includes a first LED device, a second LED device, and a light switching element. The first LED device is capable of emitting a first light beam along a first light path during a first time period. The second LED device is capable of emitting a second light beam along a second light path during a second time period. The light switching element is disposed at an intersection of the first light path and the second light path for permitting one of the first light beam and the second light beam to be transmitted along a third light path.

In an embodiment, the light switching element includes a rotary disc having a transmission region and a reflection region, the area of the transmission region is substantially the same as the area of the reflection region, the transmission region includes a high-transmittance transparent lens, and the reflection region includes a reflective mirror.

In an embodiment, the rotary disc is capable of being rotated at a specified rotating speed. The first light beam along the first light path passes through the transmission region and is transmitted along the third light path when the transmission region is rotated to the intersection of the first light path and the second light path. The second light beam along the second light path is reflected by the reflection region and is transmitted along the third light path when the reflection region is rotated to the intersection of the first light path and the second light path.

In an embodiment, the first LED device is in a light emitting state and the second LED device is turned off when the transmission region is rotated to the intersection of the first light path and the second light path, and the second LED device is in the light emitting state and the first LED device is turned off when the reflection region is rotated to the intersection of the first light path and the second light path.

In an embodiment, a plurality of monochromatic LEDs of the first LED device emit light in turn when the first LED device is in the light emitting state, and a plurality of monochromatic LEDs of the second LED device emit light in turn when the second LED device is in the light emitting state.

In an embodiment, the color sequence of the light emitted in turn by the monochromatic LEDs of the first LED device and the color sequence of the light emitted in turn by the monochromatic LEDs of the second LED device are reverse.

In an embodiment, the first LED device and the second LED device are simultaneously capable of emitting the monochromatic lights during a spoke time.

In an embodiment, the light switching element includes a digital micromirror device for permitting one of the first light beam along the first light path and the second light beam along the second light path to be transmitted along the third light path.

In accordance with another aspect of the embodiment of the invention, a light source module adapted to be used in a projection apparatus is provided. The light source module includes a first LED device, a second LED device, a third LED device, a first light switching element, and a second light switching element. The first LED device is capable of emitting a first light beam along a first light path during a first time period. The second LED device is capable of emitting a second light beam along a second light path during a second time period. The first light switching element is disposed at an intersection of the first light path and the second light path for permitting one of the first light beam and the second light beam to be transmitted along a third light path. The third LED device is capable of emitting a third light beam along a fourth light path during a third time period. The second light switching element is disposed at an intersection of the third light path and the fourth light path for permitting one of the first light beam along the third light path and the second light beam along the third light path or the third light beam along a fourth light path to be transmitted along a fifth light path.

In an embodiment, the first light switching element includes a first rotary disc having a transmission region and a reflection region, and the area of the transmission region is twice as large as the area of the reflection region. The transmission region includes a high-transmittance transparent lens and the reflection region includes a reflective mirror. The first rotary disc is rotated at a specified rotating speed. The first light beam along the first light path passes through the transmission region and is transmitted along the third light path when the transmission region is rotated to the intersection of the first light path and the second light path. The second light beam along the second light path is reflected by the reflection region and is transmitted along the third light path when the reflection region is rotated to the intersection of the first light path and the second light path.

In an embodiment, the second light switching element includes a second rotary disc having a transmission region and a reflection region, and the area of the transmission region is twice as large as the area of the reflection region. The transmission region includes a high-transmittance transparent lens and the reflection region includes a reflective mirror. The second rotary disc is rotated at a specified rotating speed. One of the first light beam along the third light path and the second light beam along the third light path passes through the transmission region and is transmitted along the fifth light path when the transmission region is rotated to the intersection of the third light path and the fourth light path. The third light beam along the fourth light path is reflected by the reflection region and is transmitted to the fifth light path when the reflection region is rotated to the intersection of the third light path and the fourth light path.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
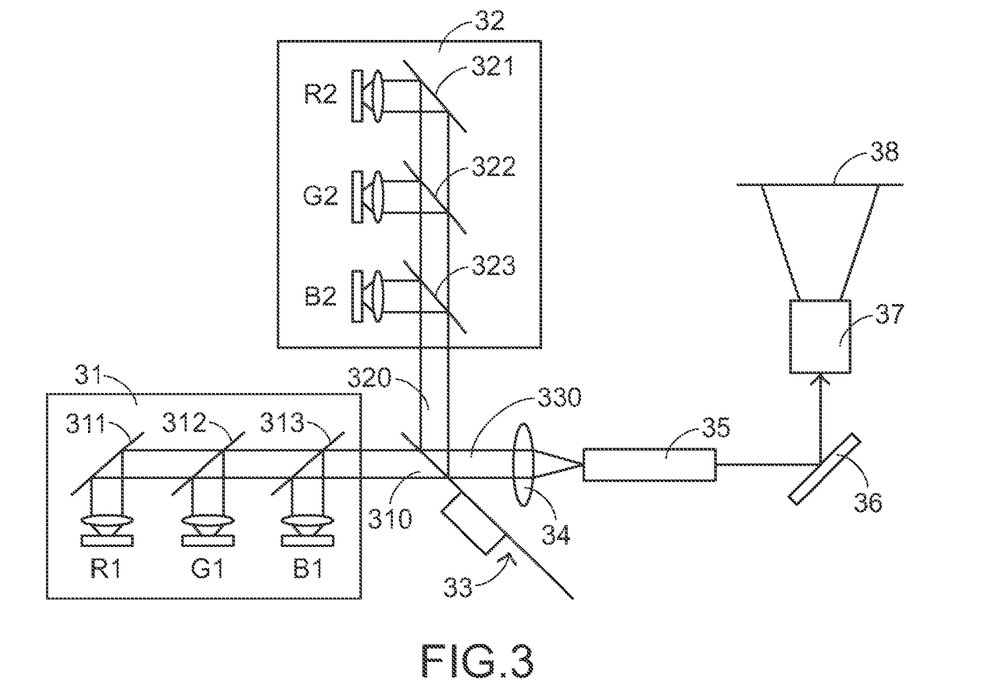
FIG. 3 is a schematic view illustrating a light source module adapted to be used in a projection apparatus according to an embodiment of the invention.

FIG. 3 is a schematic view illustrating a light source module adapted to be used in a projection apparatus according to an embodiment of the invention. The light source module includes a first LED device 31, a second LED device 32, and a light switching element 33. Each of the first LED device 31 and the second LED device 32 includes a plurality of monochromatic LEDs. As shown in FIG. 3, the first LED device 31 includes three monochromatic LEDs R1, G1, and B1, a reflective mirror 311, and two dichroic mirrors 312 and 313. The monochromatic LEDs R1, G1, and B1 may emit a red light beam, a green light beam, and a blue light beam respectively. By means of the reflective mirror 311 and the dichroic mirror 312 and 313, the red light beam is reflected by the reflective mirror 311. The dichroic mirror 312 permits the red light beam to pass through the dichroic mirror 312 and reflects the green light beam. The dichroic mirror 313 permits the red light beam and the green light beam to pass through the dichroic mirror 313 and reflects the blue light beam. After processed by the reflective mirror 311 and the dichroic mirrors 312 and 313, the red, green and blue light beams are mixed as a first light beam for being transmitted along a first light path 310. The second LED device 32 includes three LEDs R2, G2, and B2, a reflective mirror 321, and two dichroic mirrors 322 and 323. The LEDs R2, G2 and B2 may emit a red light beam, a green light beam, and a blue light beam respectively. By means of the reflective mirror 321 and the dichroic mirror 322 and 323, the red light beam is reflected by the reflective mirror 321. The dichroic mirror 322 permits the red light beam to pass through the dichroic mirror 322 and reflects the green light beam. The dichroic mirror 323 permits the red light beam and the green light beam to pass through the dichroic mirror 323 and reflects the blue light beam. After processed by the reflective mirror 321 and the dichroic mirrors 322 and 323, the red, green and blue light beams are mixed as a second light beam for being transmitted along a second light path 320. The wavelength of the red light beam emitted by the LED R1 is substantially the same as the wavelength of the red light beam emitted by the LED R2. The wavelength of the green light beam emitted by the LED G1 is substantially the same as the wavelength of the green light beam emitted by the LED G2. The wavelength of the blue light beam emitted by the LED B1 is substantially the same as the wavelength of the blue light beam emitted by the LED B2.

The light switching element 33 is disposed at an intersection of the first light path 310 and the second light path 320. By the light switching element 33, one of the first light beam along the first light path 310 and the second light beam along the second light path 320 is permitted to be transmitted along a third light path 330. In addition, a condenser lens 34 and an integrator rod 35 are disposed in the third light path 330. The first or second light beam that is permitted to be transmitted along the third light path 330 is then focused by the condenser lens 34. The focused first or second light beam is subject to homogenization by the integrator rod 35 and then processed by the digital micromirror device 36 to create a visual image on a screen 38 through a projection lens set 37.

Figure 4:
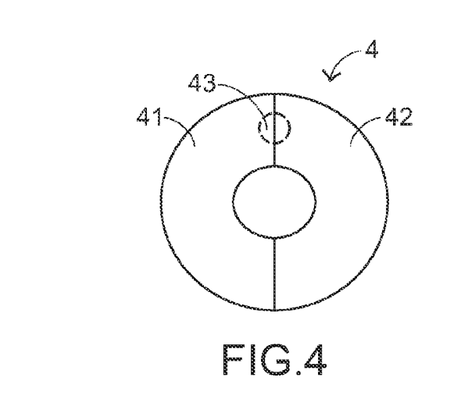
FIG. 4 is a schematic view illustrating an exemplary rotary disc used in a light switching element according to an embodiment of the invention.

FIG. 4 is a schematic view illustrating an exemplary rotary disc used in a light switching element according to an embodiment of the invention. In this embodiment, the light switching element 33 includes a rotary disc 4. The rotary disc 4 includes a transmission region 41 and a reflection region 42. The transmission region 41 includes a high-transmittance transparent lens. The reflection region 42 includes a reflective mirror. The area of the transmission region 41 is substantially the same as the area of the reflection region 42. The rotary disc 4 is rotated at a specified rotating speed. When the transmission region 41 is rotated to the intersection of the first light path 310 and the second light path 320, the first light beam along the first light path 310 passes through the transmission region 41 and is transmitted along the third light path 330. On the other hand, when the reflection region 42 is rotated to the intersection of the first light path 310 and the second light path 320, the second light beam along the second light path 320 is reflected by the reflection region 42 and is transmitted along the third light path 330.

As a consequence, the first LED device 31 and the second LED device 32 are capable of emitting light in turn. For example, the first LED device 31 emits the first light beam during a first time period and the second LED device 32 emits the second light beam during a second time period. When the transmission region 41 is rotated to the intersection of the first light path 310 and the second light path 320, the first LED device 31 is in the "on" state (light emitting state) and the second LED device 32 is in the "off" state. Whereas, when the reflection region 42 is rotated to the intersection of the first light path 310 and the second light path 320, the second LED device 32 is in the "on" state (light emitting state) and the first LED device 31 is in the "off" state.

Figure 5A:
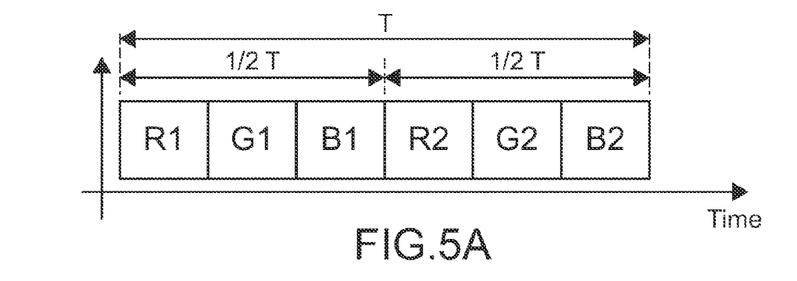
FIG. 5A is a schematic timing diagram illustrating a color series of the light emitted in turn by a first LED device and a second LED device according to an embodiment of the invention.

FIG. 5A is a schematic timing diagram illustrating a color series of the light emitted in turn by the first LED device and the second LED device according to an embodiment of the invention. As shown in FIG. 5A, during the cycle T of rotating the rotary disc 4, the monochromatic LEDs R1, G1, and B1 of the first LED device 31 sequentially emit light during the former half cycle and the monochromatic LEDs R2, G2, and B2 of the second LED device 32 sequentially emit light during the latter half cycle. Since the first LED device 31 and the second LED device 32 emit color beams in an alternate lighting manner, each LED device has been turned off for a half cycle as the rotary disc 4 is rotated for a revolution. Under this circumstance, the thermal load of every LED device is reduced and the operating temperature of each LED device is decreased. As the temperature of the LED is decreased, the illuminating efficiency of the LED is increased and thus the overall brightness value of the projection apparatus is effectively enhanced.

As known, the color beam may become briefly inconsistent in the transitional state and usually result in color variance. The time period during the transitional state is usually referred as a spoke time. When the interface between the transmission region 41 and the reflection region 42 (e.g. the beam pattern 43 as shown in FIG. 4) is rotated to the intersection of the first light path 310 and the second light path 320, the first light beam and the second light beam may be simultaneously transmitted along the third light path 330 during this spoke time. As shown in FIG. 5A, the color beams emitted by the monochromatic LEDs R1 and B2 (or the monochromatic LEDs B1 and R2) are simultaneously transmitted along the third light path 330 during the spoke time. The mixed color beam may not be used because the mixed color beam would adversely affect the color purity of the created image. For solving the drawbacks resulted from the spoke time, the color series of the light emitted in turn by the first LED device and the second LED device needs to be improved.

Figure 5B:
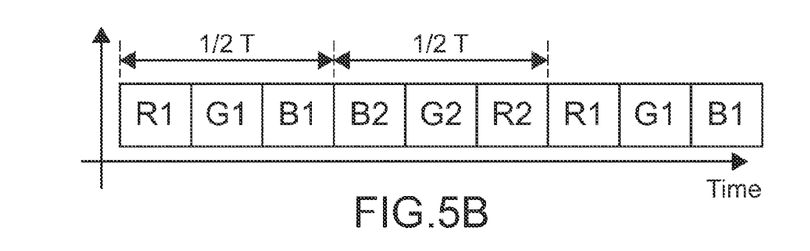
FIG. 5B is a schematic timing diagram illustrating another color series of the light emitted in turn by the first LED device and the second LED device according to an embodiment of the invention.

FIG. 5B is a schematic timing diagram illustrating another color series of the light emitted in turn by the first LED device and the second LED device according to an embodiment of the invention. As shown in FIG. 5B, the monochromatic LEDs are alternately turned on according to the sequence of R1G1B1, B2G2R2, R1G1B1, B2G2R2. In other words, the color sequence of the light emitted in turn by the monochromatic LEDs of the first LED device and the color sequence of the light emitted in turn by the monochromatic LEDs of the second LED device are reverse. As a consequence, the first light beam and the second light beam of the same color are simultaneously transmitted along the third light path 330 during the spoke time. Under this circumstance, the color variance is avoided.

Figure 5C:
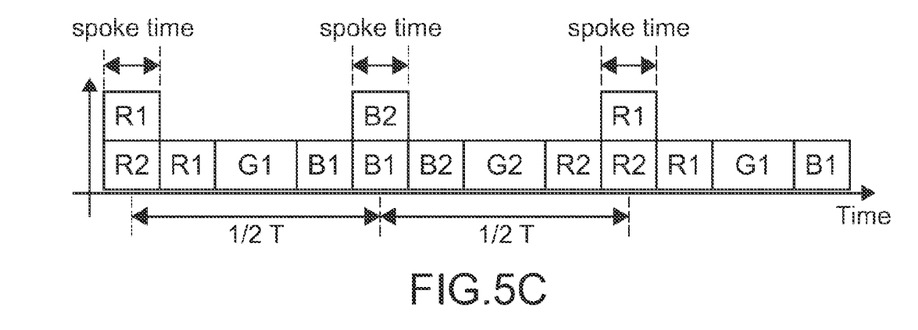
FIG. 5C is a schematic timing diagram illustrating a further color series of the light emitted in turn by the first LED device and the second LED device according to an embodiment of the invention.

In a case that the spoke time is too long, the monochromatic LEDs R1, G1, and B1 of the first LED device 31 and the monochromatic LEDs R2, G2, and B2 of the second LED device 32 may be alternately turned on according to the color sequence as shown in FIG. 5C. As shown in FIG. 5C, the monochromatic LEDs are alternately turned on according to the sequence of R1G1B1, B2G2R2, R1G1B1, B2G2R2. In this embodiment, the monochromatic LEDs R2 and R1 and the monochromatic LEDs B1 and B2 simultaneously emit the same color beam during the spoke time. Since the first light beam and the second light beam of the same color are simultaneously transmitted along the third light path 330 during the spoke time, the color variance is avoided. In addition, since the operating temperature of each LED device is decreased, the overall brightness value of the projection apparatus is effectively enhanced.

Figure 6:
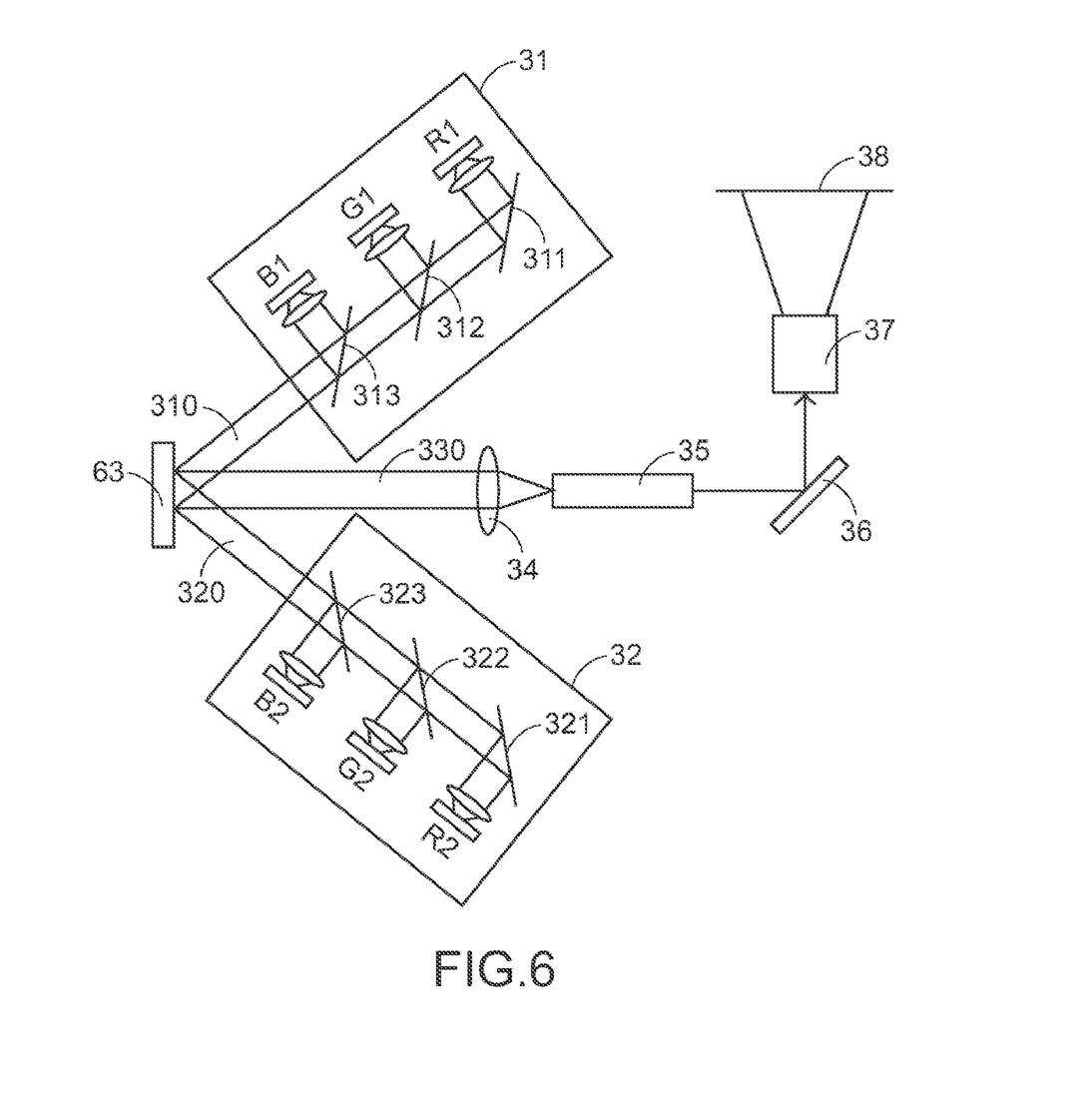
FIG. 6 is a schematic view illustrating a light source module adapted to be used in a projection apparatus according to another embodiment of the invention.

FIG. 6 is a schematic view illustrating a light source module adapted to be used in a projection apparatus according to another embodiment of the invention. As shown in FIG. 6, the light source module includes a first LED device 31, a second LED device 32, and a light switching element 63. Each of the first LED device 31 and the second LED device 32 includes a plurality of monochromatic LEDs. The first LED device 31 includes three monochromatic LEDs R1, G1, and B1 for emitting a red light beam, a green light beam, and a blue light beam respectively. By means of a reflective mirror 311 and two dichroic mirrors 312 and 313, the red, green, and blue light beams are mixed as a first light beam for being transmitted along a first light path 310. The second LED device 32 includes three LEDs R2, G2, and B2 for emitting a red light beam, a green light beam, and a blue light beam respectively. By means of a reflective mirror 321 and two dichroic mirrors 322 and 323, the red, green, and blue light beams are mixed as a second light beam for being transmitted along a second light path 320.

The light switching element 63 is disposed at an intersection of the first light path 310 and the second light path 320. By the light switching element 63, one of the first light beam along the first light path 310 and the second light beam along the second light path 320 is permitted to be transmitted along a third light path 330. In addition, a condenser lens 34 and an integrator rod 35 are disposed in the third light path 330. The first or second light beam that is permitted to be transmitted along the third light path 330 is then focused by the condenser lens 34. The focused first or second light beam is subject to homogenization by the integrator rod 35 and then processed by the digital micromirror device 36 to create a visual image on a screen 38 through a projection lens set 37.

In this embodiment, the light switching element 63 is also a digital micromirror device having the same configuration as the digital micromirror device 36. Because all micromirrors of the digital micromirror device are controllable to result in angular change, one of the first light beam along the first light path 310 and the second light beam along the second light path 320 may be transmitted along the third light path 330. In other words, the functions of the light switching element 63 are similar to the functions of the rotary disc 4. By using the light switching element 63, the monochromatic LEDs R1, G1, and B1 of the first LED device 31 and the monochromatic LEDs R2, G2, and B2 of the second LED device 32 are alternately turned on according to the color sequence as shown in FIG. 5A, 5B or 5C. The operating principles are similar to those illustrated in FIG. 5A, 5B or 5C, and not redundantly described herein.

Figure 7:
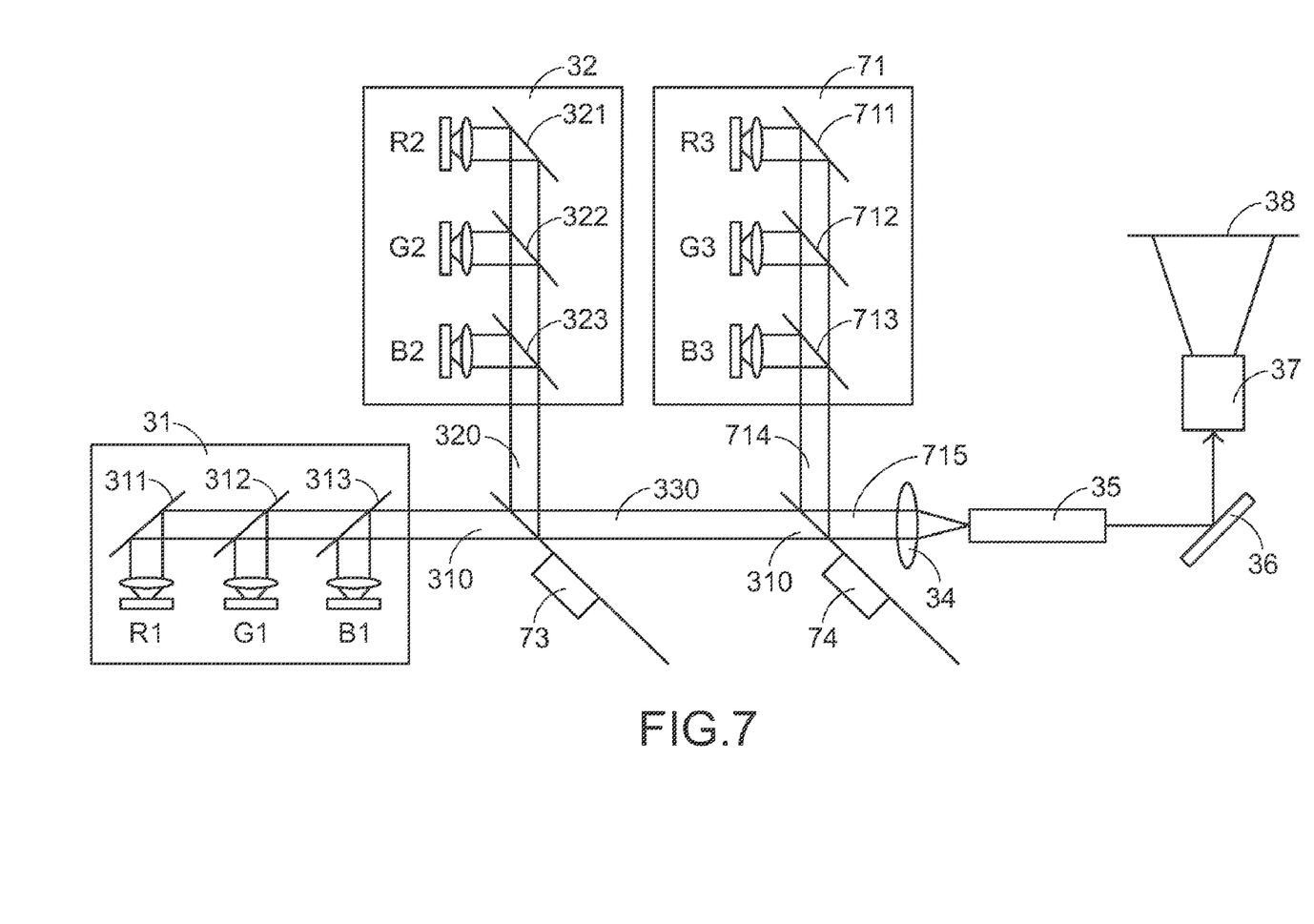
FIG. 7 is a schematic view illustrating a light source module adapted to be used in a projection apparatus according to a further embodiment of the invention.

FIG. 7 is a schematic view illustrating a light source module adapted to be used in a projection apparatus according to a further embodiment of the invention. In comparison with FIGS. 3 and 6, the light source module of FIG. 7 includes three LED devices and two light switching elements. As shown in FIG. 7, the light source module includes a first LED device 31, a second LED device 32, a third LED device 71, a first light switching element 73, and a second light switching element 74. Each of the first LED device 31, the second LED device 32, and the third LED device 71 includes a plurality monochromatic LEDs. The third LED device 71 includes three monochromatic LEDs R3, G3, and B3 for emitting a red light beam, a green light beam, and a blue light beam respectively. By means of a reflective mirror 711 and two dichroic mirror 712 and 713, the red light beam is reflected by the reflective mirror 711. The dichroic mirror 712 permits the red light beam to pass through the dichroic mirror 712 and reflects the green light beam. The dichroic mirror 713 permits the red light beam and the green light beam to pass through the dichroic mirror 713 and reflects the blue light beam. After processed by the reflective mirror 711 and the dichroic mirrors 712 and 713, the red, green, and blue light beams are mixed as a third light beam for being transmitted along a fourth light path 714. The operating principles of the first LED device 31 and the second LED device 32 are identical to those illustrated in FIGS. 3 and 6, and not redundantly described herein.

Figure 8A:
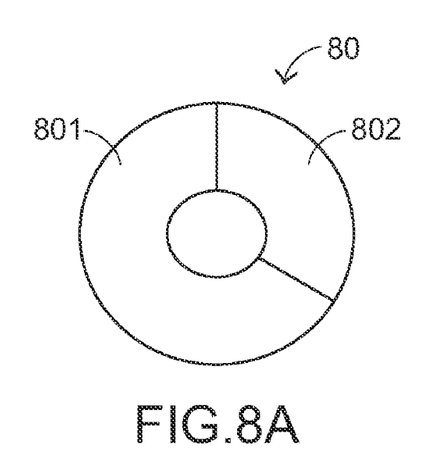
FIGS. 8A and 8B are schematic views illustrating exemplary rotary discs used in the first and second light switching elements according to an embodiment of the invention.
Figure 8B:
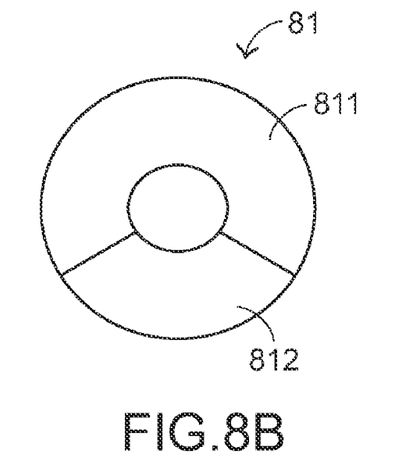
Figure 9:
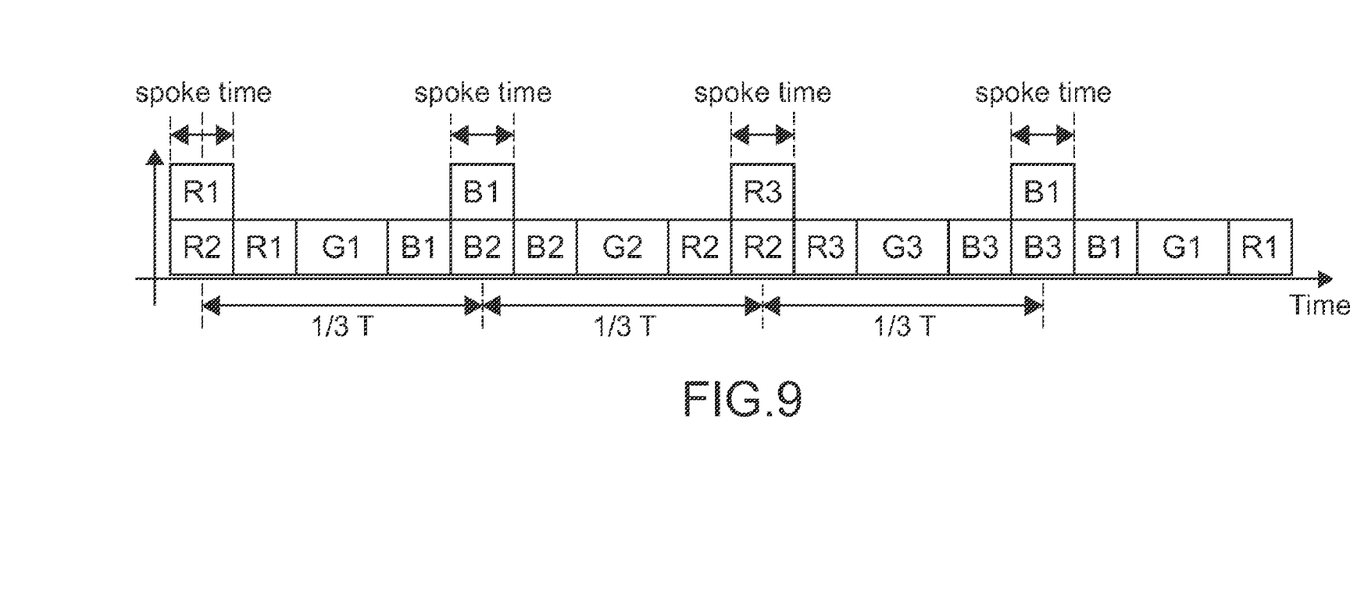
FIG. 9 is a schematic timing diagram illustrating a color series of the light emitted in turn by the first LED device, the second LED device, and the third LED device according to an embodiment of the invention.

FIGS. 8A and 8B are schematic views illustrating exemplary rotary discs used in the first and second light switching elements according to an embodiment of the invention. The first light switching element 73 is disposed at an intersection of the first light path 310 and the second light path 320. The second light switching element 74 is disposed at an intersection of the third light path 330 and the fourth light path 714. The first light switching element 73 includes a rotary disc 80. The second light switching element 74 includes another rotary disc 81. The rotary disc 80 and the rotary disc 81 are both rotated at a cycle T. The rotary disc 80 includes a transmission region 801 and a reflection region 802. The area of the transmission region 801 is twice as large as the area of the reflection region 802. The transmission region 801 includes a high-transmittance transparent lens. The reflection region 802 includes a reflective mirror. The rotary disc 81 includes a transmission region 811 and a reflection region 812. The area of the transmission region 811 is twice as large as the area of the reflection region 812. The transmission region 811 includes a high-transmittance transparent lens. The reflection region 812 includes a reflective mirror. By using the first light switching element 73 and the second light switching element 74, the monochromatic LEDs R1, G1, and B1 of the first LED device 31, the monochromatic LEDs R2, G2, and B2 of the second LED device 32, and the monochromatic LEDs R3, G3, and B3 of the third LED device 71 are alternately turned on according to the color sequence as shown in FIG. 9. As shown in FIG. 9, each LED device has been turned off for a two-thirds cycle as each of the rotary discs 80 and 81 is rotated for a revolution. Under this circumstance, the operating temperature of each LED device is largely decreased and thus the overall brightness value of the projection apparatus is effectively enhanced.

In some embodiments, the first light switching element 73 and the second light switching element 74 are digital micromirror devices. Alternatively, one of the first light switching element 73 and the second light switching element 74 is a digital micromirror device and the other is a rotary disc. It is noted that, however, those skilled in the art will readily observe that numerous modifications and alterations may be made while retaining the teachings of the invention.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, adapted to be used in a projection apparatus, the light source module comprising:

a first light emitting diode device capable of emitting a first light beam along a first light path during a first time period, a plurality of monochromatic light emitting diodes of the first light emitting diode device emitting light in turn when the first light emitting diode device is in a light emitting state;

a second light emitting diode device capable of emitting a second light beam along a second light path during a second time period, a plurality of monochromatic light emitting diodes of the second light emitting diode device emitting light in turn when the second light emitting diode device is in a light emitting state; and a light switching element disposed at an intersection of the first light path and the second light path for permitting one of the first light beam and the second light beam to be transmitted along a third light path, the light switching element comprising a rotary disc having a transmission region and a reflection region, wherein the first light emitting diode device is in the light emitting state and the second light emitting diode device is turned off when the transmission region is rotated to the intersection of the first light path and the second light path, and the second light emitting diode device is in the light emitting state and the first light emitting diode device is turned off when the reflection region is rotated to the intersection of the first light path and the second light path, a color sequence of the light emitted in turn by the monochromatic light emitting diodes of the first light emitting diode device and a color sequence of the light emitted in turn by the monochromatic light emitting diodes of the second light emitting diode device are reverse, such that the first light emitting diode device and the second light emitting diode device are capable of emitting monochromatic lights with the same color during a spoke time so as to avoid color variance.

2. The light source module according to claim 1, wherein the first light emitting diode device comprises:

three monochromatic light emitting diodes capable of emitting a red light beam, a green light beam, and a blue light beam respectively;

a reflective mirror for reflecting the red light beam;

a first dichroic mirror for permitting the red light beam to pass through the first dichroic minor and for reflecting the green light beam; and a second dichroic minor for permitting the red light beam and the green light beam to pass through the second dichroic minor and for reflecting the blue light beam, wherein the red light beam, the green light beam, and the blue light beam are mixed as the first light beam for being transmitted along the first light path.

3. The light source module according to claim 1, wherein the second light emitting diode device comprises:
- three monochromatic light emitting diodes capable of emitting a red light beam, a green light beam, and a blue light beam respectively;
- a reflective mirror for reflecting the red light beam;
- a first dichroic mirror for permitting the red light beam to pass through the first dichroic minor and for reflecting the green light beam; and
- a second dichroic minor for permitting the red light beam and the green light beam to pass through the second dichroic minor and for reflecting the blue light beam, wherein the red light beam, the green light beam, and the blue light beam are mixed as the second light beam for being transmitted along the second light path.

4. The light source module according to claim 1, wherein the area of the transmission region is substantially the same as the area of the reflection region, the transmission region comprises a transparent lens, and the reflection region comprises a reflective minor.

5. The light source module according to claim 4, wherein the rotary disc is capable of being rotated at a specified rotating speed, the first light beam along the first light path passes through the transmission region and is transmitted along the third light path when the transmission region is rotated to the intersection of the first light path and the second light path, the second light beam along the second light path is reflected by the reflection region and is transmitted along the third light path when the reflection region is rotated to the intersection of the first light path and the second light path.

* * * * *